(12) United States Patent
DeCanio et al.

(10) Patent No.: US 6,224,062 B1
(45) Date of Patent: May 1, 2001

(54) ROLLER SKATE AND SKATEBOARD BEARING COVERS

(75) Inventors: Paul Joseph DeCanio, Brentwood, NY (US); Edward Anthony Vanella, San Jose, CA (US)

(73) Assignees: Paul J. DeCanio, Brentwood, NY (US); Edward A. Vanella, San Jose, CA (US)

( * ) Notice: Subject to any disclaimer, the term of this patent is extended or adjusted under 35 U.S.C. 154(b) by 0 days.

(21) Appl. No.: 09/223,523

(22) Filed: Dec. 30, 1998

(51) Int. Cl.$^7$ ........................................................ F16J 15/34
(52) U.S. Cl. ............................................. 277/370; 277/384
(58) Field of Search ...................................... 277/370, 384, 277/379, 407

(56) References Cited

U.S. PATENT DOCUMENTS

| | | | |
|---|---|---|---|
| 1,489,197 | * | 4/1924 | Daverkosen et al. . |
| 3,594,050 | * | 7/1971 | Gothberg . |
| 3,639,016 | * | 2/1972 | Bourgeois . |
| 3,770,992 | * | 11/1973 | Veglia . |
| 3,847,455 | * | 11/1974 | Vandermeulen et al. . |
| 3,858,950 | * | 1/1975 | Otto . |
| 4,043,620 | * | 8/1977 | Otto . |
| 4,771,677 | * | 9/1988 | Rohde et al. . |
| 4,919,551 | * | 4/1990 | Numotani et al. . |
| 5,017,024 | * | 5/1991 | Clark et al. . |
| 5,362,075 | * | 11/1994 | Szendel . |

\* cited by examiner

*Primary Examiner*—James R. Brittain
*Assistant Examiner*—John L. Beres

(57) ABSTRACT

A roller skate and skateboard bearing cover that seals a bearing assembly and axle from foreign matter having a thin circular body structure (1) which has a center hole (6) which allows the bearing axle therethrough in which fastens the bearing covers (8a,8b) in a stationary mode concentrically to the bearing, a angular section (5) which acts as a spring that allows continuous biased tension of the body (1) flange section (4) to the bearing outer race surface means for sealing the bearing assembly and axle and allowing the body (1) projecting edge (2) to remove all foreign matter from the sealing surface. The bearing cover is made of a strong flexible material so that it can facilitate flexing under all loads and operating modes without fracturing.

1 Claim, 1 Drawing Sheet

EXPLODED VIEW

ROLLER SKATE AND SKATEBOARD BEARING COVERS

BACKGROUND OF THE INVENTION

1. Field of the Invention

The invention relates generally to a device that seals roller skate and skateboard bearings and axles from the indoor and outdoor elements and the entrapment of string.

2. Description of the Prior Art

Roller skates and skateboards currently in use have semisealed bearings and open axles. the problem with this is that centrifugal force produced during the operation mode causes water, dirt and dust to enter the bearing assembly which results in excessive churning, friction, and heat, which will break down the lubricant and eventually damage the bearings which is reductive to the performance and bearing life, also the entrapment of string or the like between the bearing and the axle which reduces performance and can cause a violent stop. This invention eliminates these problems.

SUMMARY OF THE INVENTION

The invention relates to a device to keep water, dirt and dust from entering the bearing assembly and axle, and which will keep string from being wrapped around the axle.

It is an object of the invention to provide an inexpensive means of sealing the wheel bearing assembly and axle from the indoor and outdoor elements and which does not interfere with the rotational function of the wheel bearing assembly.

Another object of this invention is to be compact in size and compatible with the wheel bearing assembly, thereby not interfering with the normal operating paths of the other components.

Yet another object of this invention is to be of a permanent fixed nature requiring no maintenance under all radial and axial loads and operating conditions.

DESCRIPTION OF THE PREFERRED EMBODIMENT

Figure 1:
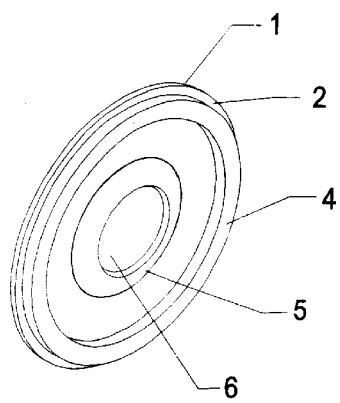
FIG. 1 is a perspective view showing an embodiment of the roller skate and skateboard bearing cover.
Figure 2:
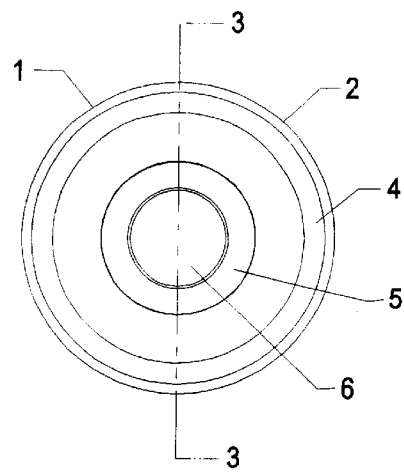
FIG. 2 is a side view of the embodiment of the roller skate and skateboard bearing cover.

Referring to FIGS. 1,2,3,4, and 5, an embodiment of the invention is shown wherein like reference characters indicate like parts throughout the several figures, the numeral 8a and 8b indicates the roller skate and skateboard bearing covers of the present invention which is shown to comprise a body member I having a center circular hole 6, a angular section 5, a circular flange section 4 which forms a projecting edge 2, FIG. 2. The body structure 1 having a circular shape in which the flange section 4, and the angular section 5 of the body 1 are concentric to the center hole 6.

Figure 3:
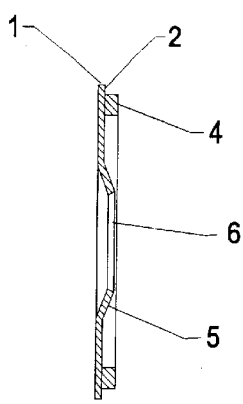
FIG. 3 is a sectional view, along Section 3—3 of FIG. 2.

As shown in FIG. 3. the angular section 5 of the body 1 is recessed to the flange section 4 side of the body 1 having a center hole 6 therethrough, the projecting edge 2 is a extension of the body 1 extending to a diameter greater than the flange section 4.

Figure 4:
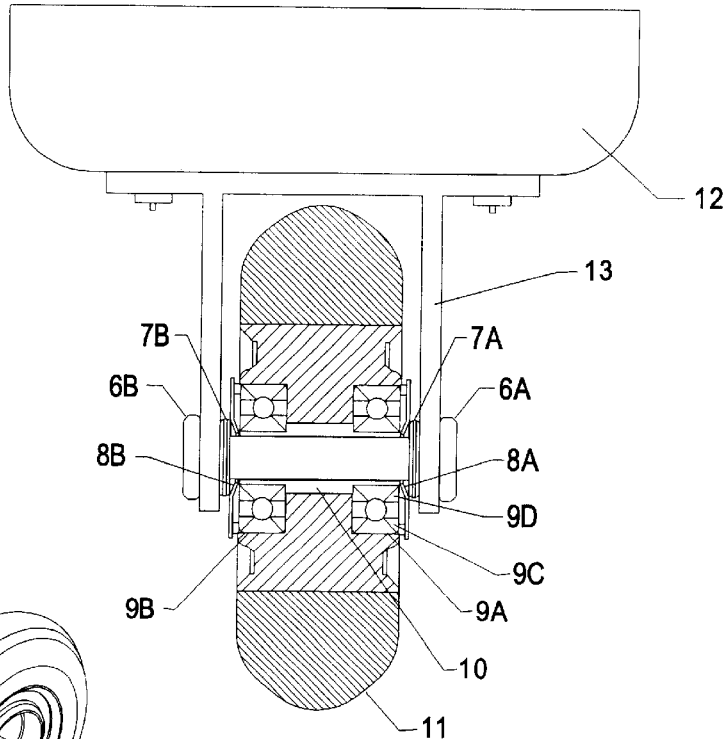
FIG. 4 is a elevational view illustrating one application of the roller skate and skateboard bearing covers installed to a wheel bearing assembly of a inline roller skate, parts being broken away in section to illustrate internal detail.
Figure 5:
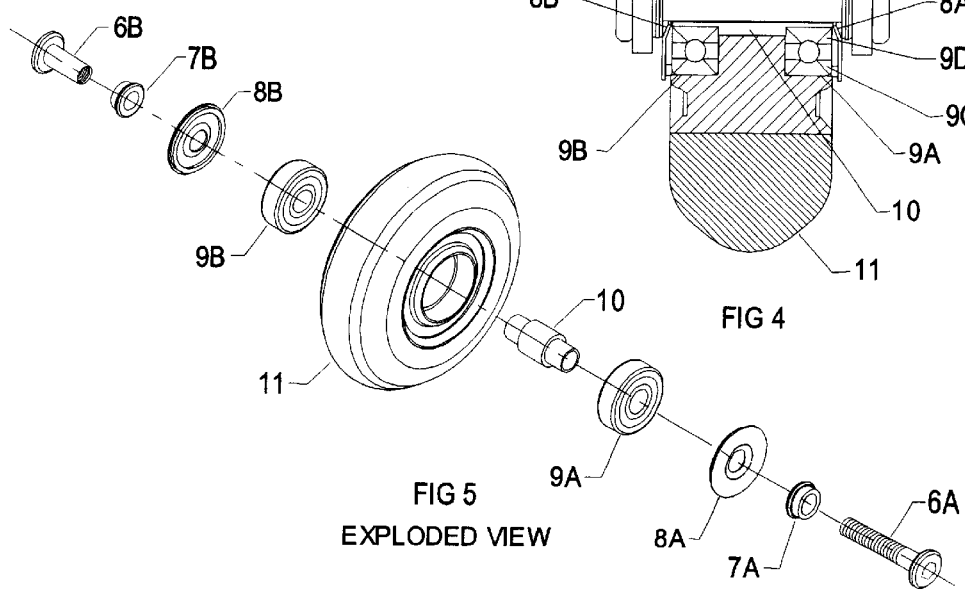
FIG. 5 is a exploded view of the embodiment of the roller skate and skateboard bearing covers as shown in FIG. 4.

Attention is directed to FIGS. 4 and 5 of the drawings wherein the bearing covers 8A, 8B are installed between the wheel housing 13 of the inline roller skate 12 and the wheel 11, the body 1 center hole 6 has a diameter greater then the wheel 11 axle screw 6A and axle nut 6B means for allowing the wheel 11 axle 6A and axle nut 6B therethrough in which the wheel 11 bushings 7A,7B would hold the body 1 angular section 5 against the bearing 9A,9B inner race 9D to the bearing spacer 10 means for holding the body 1 stationary and allowing the angular section 5 to act as a spring which will allow the flange section 4 to communicate with the bearing 9A,9B outer race 9C with continuous biased tension means for sealing out all foreign matter from the bearing 9A,9B and axle screw 6A and axle nut 6B which is removed by the projecting edge 2 under all radial and axial loads and operational modes.

Although the description above contains many specificities, these should not be construed as limiting the scope of the invention but merely providing illustrations of some of the preferred embodiments of this invention. For example, the flange section 4 of the body structure 1 can have other shapes, such as round, oval, triangular, ect.; as another example the angular section 5 size can be varied as desired. As another example the body structure 1 can be made of any suitable material such as a strong flexible plasticized material or a strong flexible metallic material. As another example the invention can be manufactured and marketed as a separate part of the wheel bearing assembly. As a further example, the invention can be manufactured and marketed as a integral part of the wheel bearing assembly.

Some of the advantages of the roller skate and skateboard bearing covers are as follows. The bearing covers 8A,8B are reusable, can easily be installed and removed to the wheel bearing assembly. The bearing covers 8A,8B are made of a heat resistant material so as not to build up excessive heat from the sealing surface. The bearing covers 8A,8B are light in weight and compact in size. The bearing covers 8A,8B are preserved and kept in operation condition require no maintenance and are self contained. The bearing covers 8A,8B of the present invention is not restricted to installation by authorized skate mechanics and are especially convenient for use by the do-it-yourselfers. further, the bearing covers 8A,8B can be used on many other items besides roller skates and skateboards.

The roller skate and skateboard bearing covers are adapted to be made of a strong, flexible and durable plastic and in a color of choice consistent with the d[0089]cor of a item to which the bearing cover is installed color wherein the flange section 4, angular section 5, projecting edge 2 and the center hole 6 are molded as part of the body structure 1. Their purpose is to seal the wheel 11 bearings 9A,9B and axle screw 6A and axle nut 6B from ambient foreign matter and remove same from the sealing surface. This will enable the skater to enjoy a long lasting and safe skate. Further, proper sealing of the wheel bearing assembly and axle will make for a high performance assembly which saves the skater the pressures of premature repairs to the wheel bearing assembly and valuable time.

We claim:

1. In combination a bearing and a bearing cover for the sealing application to a bearing assembly and axle, the bearing cover used in connection with roller skates and skateboards and intended for repeated usage, the bearing cover comprising: a body structure having a substantially thin, strong, flexible circular shape of a predetermined diameter, the body structure having parallel sides and a center circular hole extending through the body structure, the center circular hole having a diameter greater than the diameter of the axle for permitting the axle to pass through and position the body structure concentric with the axle, the body structure also having an angular section extending radially outwardly from said center circular hole to a diameter substantially less than the body structure diameter, the body structure further having a circular flange section with a diameter less than the body structure diameter which forms a projecting edge, the circular flange section being located on one of the parallel sides, the angular section extending axially on the same parallel side as the circular flange section is located, the angular section functioning as a spring to allow continuous biased tension of the circular flange section to a bearing outer race surface, functioning to seal the bearing assembly and axle and allow the projecting edge to remove foreign matter from a sealing surface.

* * * * *